US009497941B2

(12) United States Patent
Myers

(10) Patent No.: US 9,497,941 B2
(45) Date of Patent: Nov. 22, 2016

(54) MODULAR AQACULTURE SYSTEM AND METHOD OF USE

(71) Applicants: DAKOTA FISHERIES, INC, Phillip, SD (US); AquaMaof Aquaculture Technologies, Ltd, Rosh Ha'ayin (IL)

(72) Inventor: Gary Myers, Sartell, MN (US)

(73) Assignees: Dakota Fisheries, Inc.; Aqua Ma of Aquaculture Technologies, LTD

( * ) Notice: Subject to any disclaimer, the term of this patent is extended or adjusted under 35 U.S.C. 154(b) by 340 days.

(21) Appl. No.: 14/312,405

(22) Filed: Jun. 23, 2014

(65) Prior Publication Data
US 2015/0366173 A1    Dec. 24, 2015

Related U.S. Application Data

(62) Division of application No. 12/791,793, filed on Jun. 1, 2010, now Pat. No. 8,813,686.

(51) Int. Cl.
*A01K 61/00*    (2006.01)
*A01K 63/00*    (2006.01)
*A01K 63/04*    (2006.01)

(52) U.S. Cl.
CPC ............. *A01K 63/04* (2013.01); *A01K 61/00* (2013.01); *A01K 63/00* (2013.01); *A01K 63/042* (2013.01); *A01K 63/045* (2013.01)

(58) Field of Classification Search
CPC .... A01K 61/00; A01K 61/007; A01K 63/00; A01K 63/003; A01K 63/04; A01K 63/042; A01K 63/045; A01K 63/047
USPC ....... 119/200, 215, 224, 226, 227, 228, 229, 119/231, 259, 260, 261, 262, 263
See application file for complete search history.

(56) References Cited

U.S. PATENT DOCUMENTS

| | | | | |
|---|---|---|---|---|
| 5,038,715 A | * | 8/1991 | Fahs, II | A01K 67/02 119/216 |
| 5,593,574 A | | 1/1997 | Vantoever | |
| 5,947,057 A | * | 9/1999 | Perez | A01K 61/00 119/211 |
| 5,961,831 A | * | 10/1999 | Lee | A01K 63/042 119/204 |
| 8,651,058 B1 | * | 2/2014 | Pierce | A01K 61/00 119/215 |
| 2003/0106856 A1 | | 6/2003 | Choe | |
| 2006/0162667 A1 | | 7/2006 | Papdoyianis | |
| 2009/0050067 A1 | | 2/2009 | Parsons | |
| 2009/0152192 A1 | | 6/2009 | Michaels | |
| 2009/0281480 A1 | | 11/2009 | Orlebeke | |
| 2014/0311416 A1 | * | 10/2014 | Stiles, Jr. | A01K 63/042 119/263 |

FOREIGN PATENT DOCUMENTS

| | | | | |
|---|---|---|---|---|
| JP | 06105633 A | * | 4/1994 | |
| JP | 2000236773 A | * | 9/2000 | |
| WO | 9946981 A1 | | 9/1999 | |

OTHER PUBLICATIONS

PCT Application PCT-US2011-00981 Search History.

* cited by examiner

*Primary Examiner* — Son T Nguyen
(74) *Attorney, Agent, or Firm* — Yefim Kreydin

(57) ABSTRACT

A modular aquaculture system and method of use for providing a flexible cost effective system and method for producing aquaculture. The modular aquaculture system and method of use includes aquaculture holding tank for at least facilitating the grow-out of the aquaculture species, at least one oxygenation apparatus operationally couples to each one of the aquaculture holding tanks, and a filter apparatus operationally coupled to the aquaculture holding tanks.

18 Claims, 6 Drawing Sheets

Side

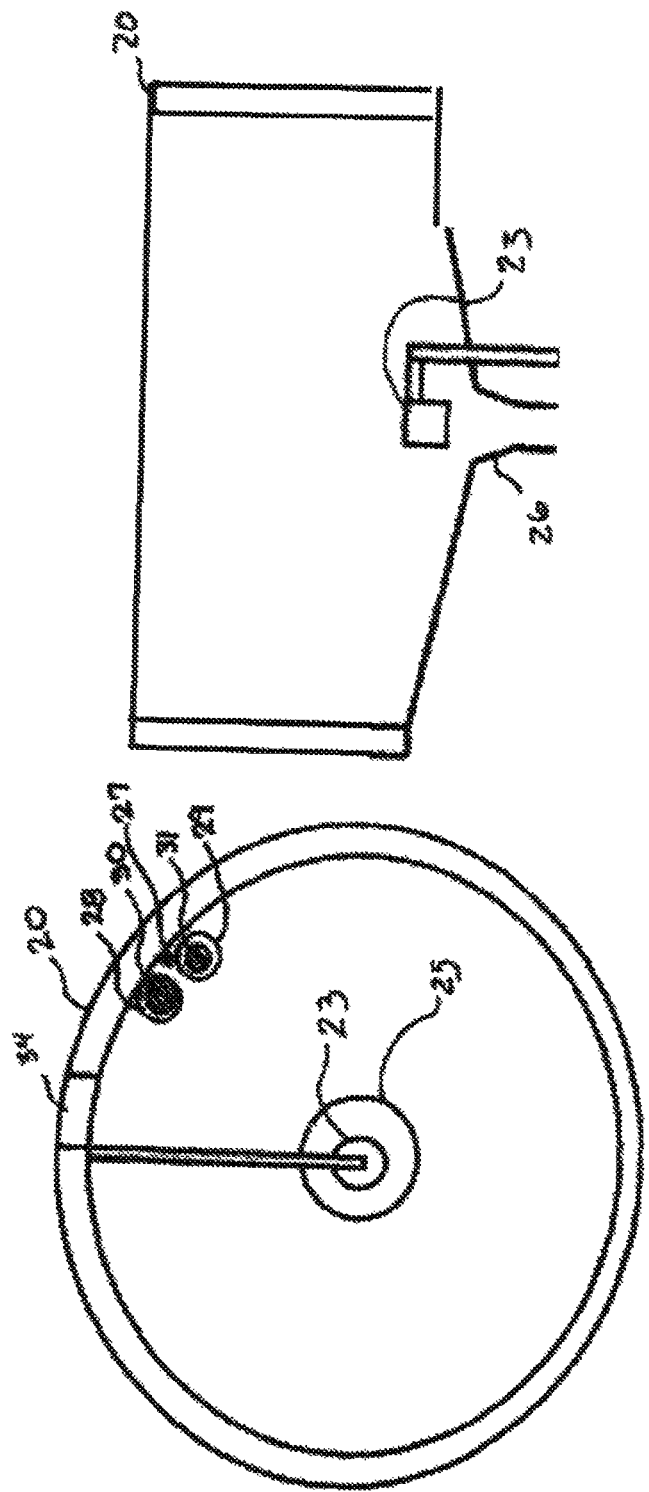

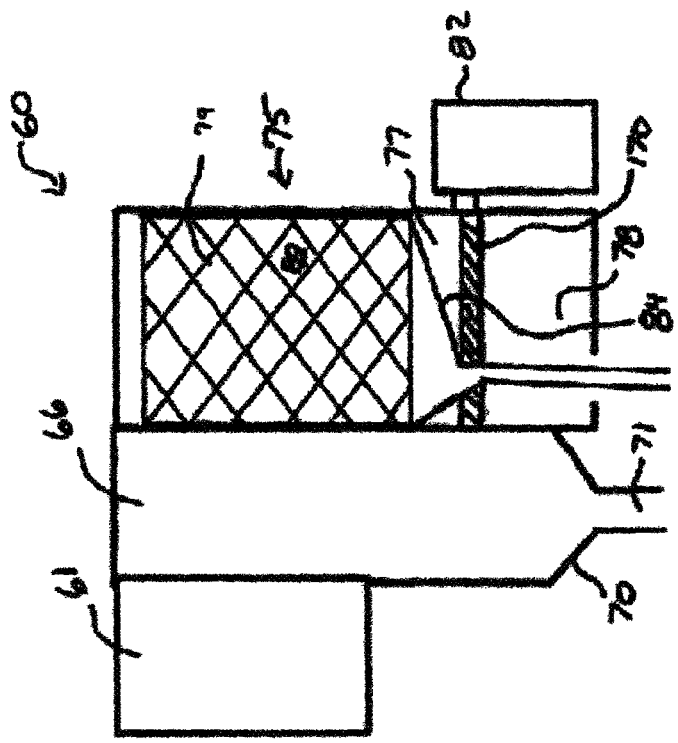
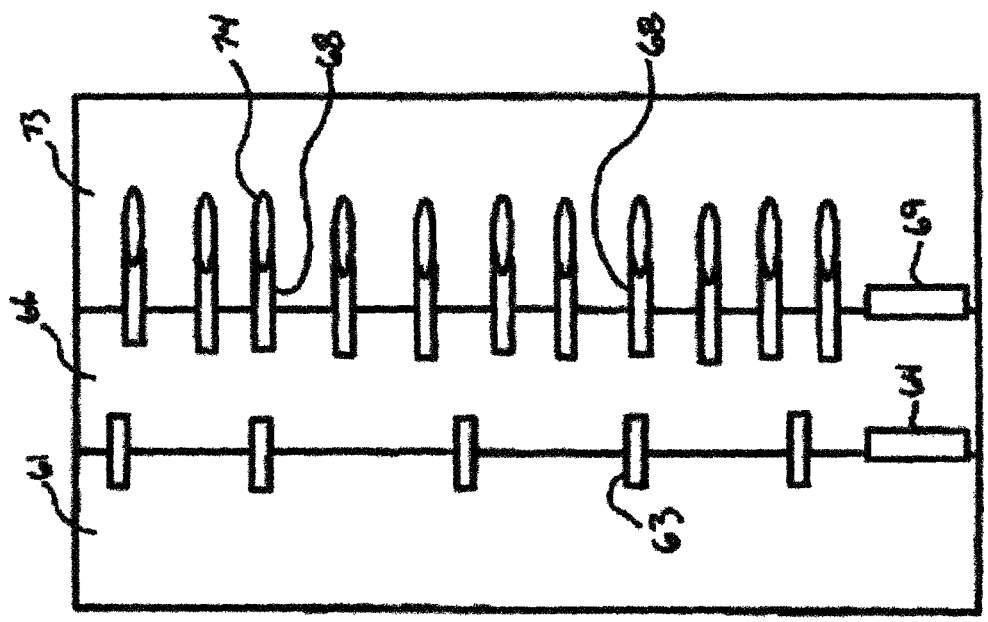

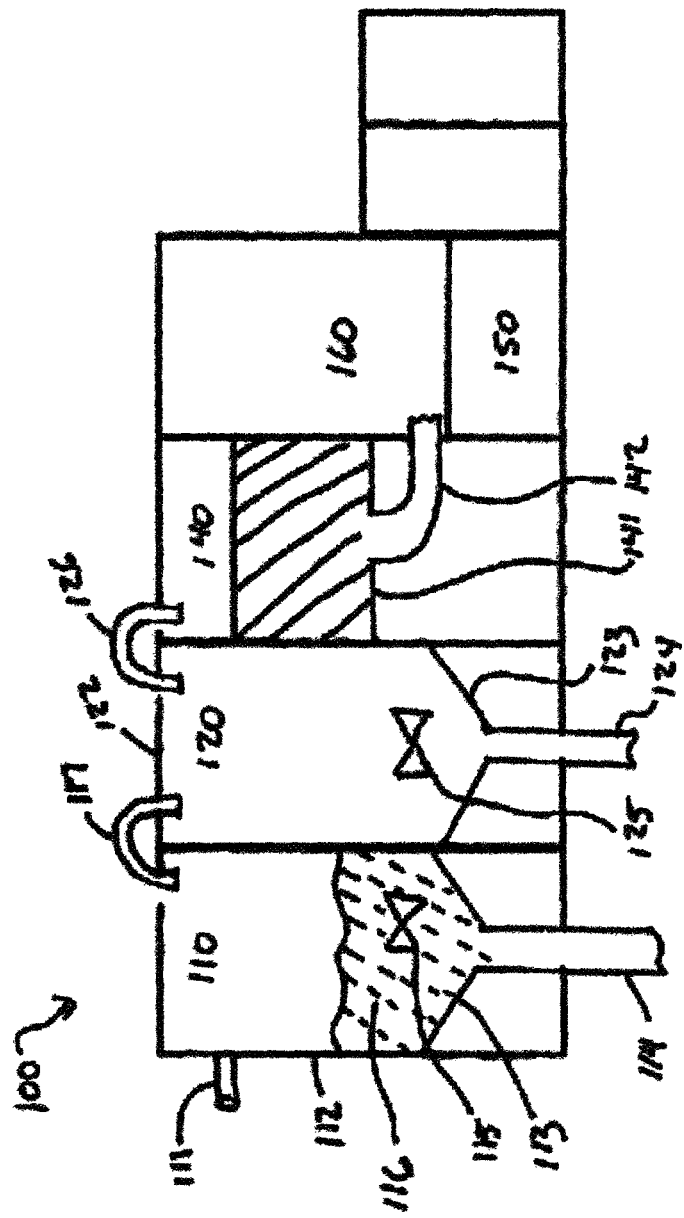

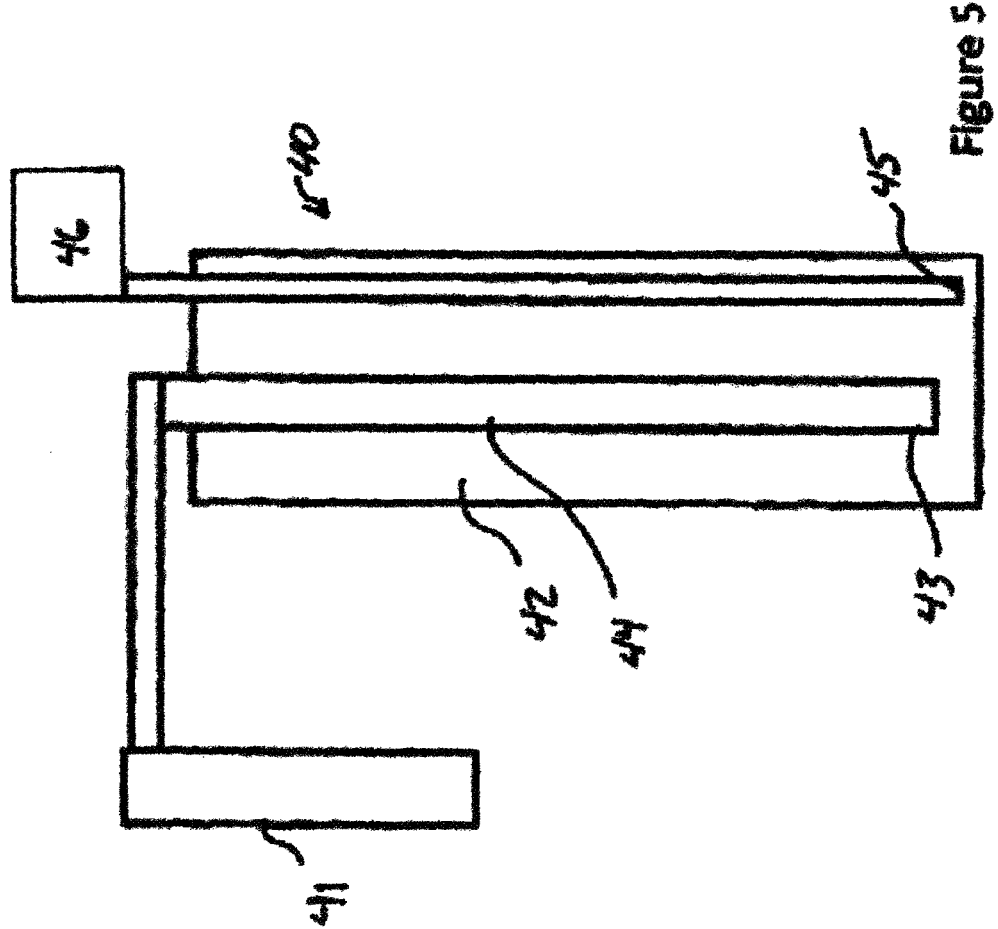

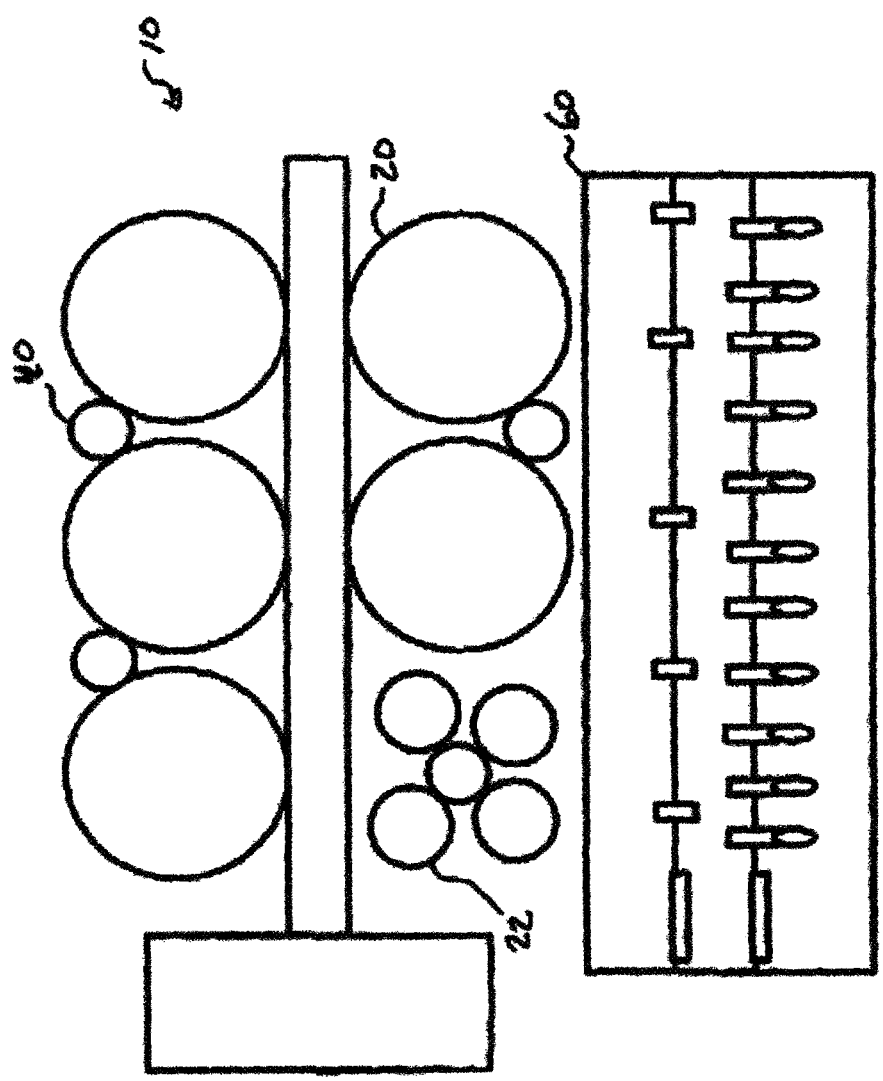

MODULAR AQACULTURE SYSTEM AND METHOD OF USE

This application is the U.S. Divisional application of U.S. application Ser. No. 12/791,793 filed, Jun. 1 2010, the entire disclosure of which is incorporated herein by reference.

BACKGROUND OF THE INVENTION

1. Field of the Invention

The present invention relates to aquaculture ponds and systems and more particularly pertains to a new Modular Aquaculture System and Method of Use for providing a flexible cost effective system and method for producing aquaculture.

2. Description of the Prior Art

The use of aquaculture ponds and systems is known in the prior art. More specifically, aquaculture ponds and systems heretofore devised and utilized are known to consist basically of familiar, expected and obvious structural configurations, notwithstanding the myriad of designs encompassed by the crowded prior art which have been developed for the fulfillment of countless objectives and requirements.

A wide range of aquaculture systems are known in the prior art including irrigation ditch and pond systems, cage systems, and indoor systems. Ditch and pond systems are not well suited to much of the available land mass because of climate related issues, such as extreme cold, lack of rainfall, and other issues. Cage systems are not suitable for areas that do not have large bodies of water to support the caged aquaculture. Indoor systems typically have significant problems with water quality, parasites, and waste dispersal. Additionally indoor systems typically require large amounts of water with high flow rates and have very high capital costs, limiting their commercial practicality in most instances.

In these respects, the Modular Aquaculture System according to the present invention substantially departs from the conventional concepts and designs of the prior art, and in so doing provides an apparatus primarily developed for the purpose of providing a flexible cost effective system and method for producing aquaculture.

SUMMARY OF THE INVENTION

In view of the foregoing disadvantages inherent in the known types of aquaculture ponds and systems now present in the prior art, the present invention provides a new Modular Aquaculture System and Method of Use construction wherein the same can be utilized for providing a flexible cost effective system and method for producing aquaculture.

To attain this, the present invention generally comprises a plurality of aquaculture holding tanks for at least facilitating the grow-out of the aquaculture species, at least one oxygenation apparatus operationally couples to each one of the aquaculture holding tanks, and a filter apparatus operationally coupled to the aquaculture holding tanks.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the adaptability of the module system for use with multiple aquaculture species.

Another significant advantage of the present invention is that the modules may be used individually, or in multiple instances for large highly integrated facilities.

Still another significant advantage of the present invention is its ability to be used in a zero discharge system.

Even still a further significant advantage of the present invention is its ability to reduce the water flow rate necessary to remove waste products, and maintain appropriate oxygen level for optimal aquaculture production.

Yet another significant advantage of the present invention is its ability to support organic aquaculture production.

Still a further significant advantage of the present invention is its ability to be scaled to larger production sizes without changes in design principle.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIGS. 2A and 2B) are a schematic functional diagram of the aquaculture holding tanks of the present invention (Top and Side views).

FIGS. 3A and 3B are a schematic functional diagram of the filter apparatus of the present invention (Top and Side views).

FIG. 4 is a schematic functional diagram of the waste treatment assembly of the present invention.

FIG. 5 is a schematic functional diagram of the oxygenation system of the present invention.

FIG. 6 is a schematic functional diagram of the present invention.

DESCRIPTION OF PREFERRED EMBODIMENTS

Figure 1:
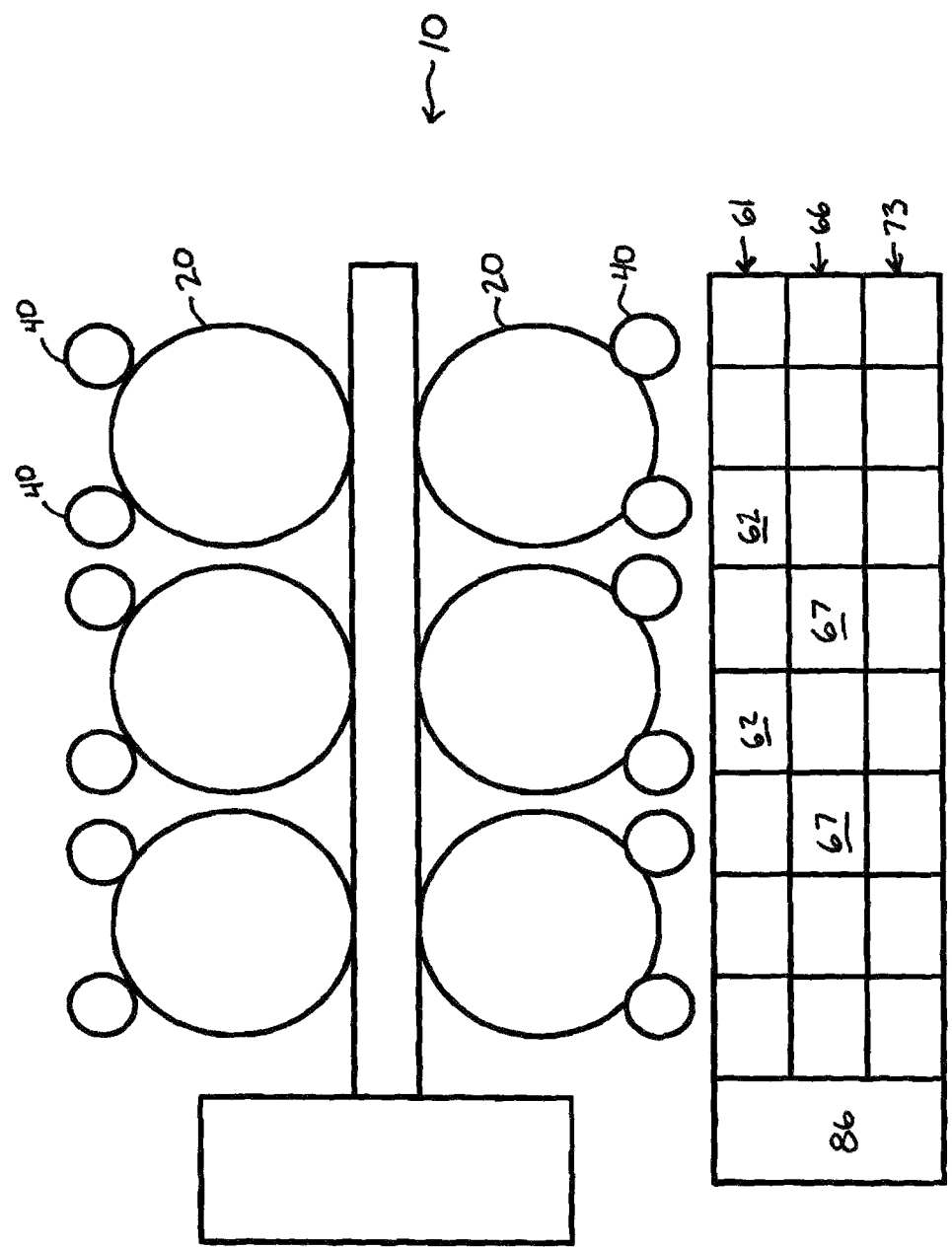
FIG. 1 is a schematic functional diagram of a new Modular Aquaculture System and Method of Use according to the present invention.

With reference now to the drawings, and in particular to FIGS. 1 through 6 thereof, a new Modular Aquaculture System and Method of Use embodying the principles and concepts of the present invention and generally designated by the reference numeral 10 will be described.

As best illustrated in FIGS. 1 through 6, the modular aquaculture system 10 and method of use 10 generally comprises a plurality of aquaculture holding tank 20 for at least facilitating the grow-out of the aquaculture species, at least one oxygenation apparatus 40 operationally couples to each one of the aquaculture holding tanks 20, and a filter apparatus 60 operationally coupled to the aquaculture holding tanks 20.

In a more preferred embodiment the aquaculture system 10 includes multiple aquaculture holding tanks 20 and an aquaculture moving channel which may be used to selectively couple at least a pair of aquaculture holding tanks 20. Additionally, the aquaculture moving channel 24 may also connect at least one of the aquaculture holding tanks 20 to a harvest area.

Typically each one of the aquaculture holding tanks 20 also includes a first drain member 23 and a second drain member 25. The first drain member 23 is operationally coupled between an interior of the aquaculture holding tank 20 and the filter apparatus 60. The second drain member 25 is preferably positioned adjacent and below the first drain member 23. The second drain member 25 preferably has a conical intake section 26.

While the modular system 10 may accommodate a wide range in the number of aquaculture holding tanks 20, and a broad number of physical configurations of holding tanks, a 2 by N array provides specific advantages for minimizing the piping required for the system 10. Additionally, when the filter apparatus 60 is positioned adjacent to the N side of the array, the efficiency of the filter apparatus 60 is improved.

In a further embodiment the first drain member 23 of the aquaculture holding tank 20 is environmentally coupled to a switch valve 27 for selectively routing the output of the first drain member 23 to the filter apparatus 60 or to a purge system.

In at least one embodiment the switch valve 27 comprises a first 28 and second tube member 29 and a first 30 and second vertical channel 31. The first vertical channel 30 can be environmentally coupled to the filter apparatus 60. The second vertical channel 31 can be environmentally coupled to the purge system. The first tube member 28 can be selectively positioned within at least a position portion of the first vertical channel 30 substantially closing the first vertical channel 20. The second tube member 29 can be selectively positioned within at least a position portion of the second vertical channel 31 substantially closing the second vertical channel 31. Alternately, a single tube member could be positioned in the non-selected vertical channel to substantially close off the non-selected vertical channel. In still a further alternative, gate valves 34 could be used to control water flow.

In an embodiment each one of the plurality of aquaculture holding tanks 20 is generally cylindrical and has approximately the same diameter.

In an alternate embodiment, the plurality of aquaculture holding tanks 20 include a subset of aquaculture holding tanks 22 having a smaller diameter, which can be positioned in the space of one aquaculture holding tank 20 having the normal diameter.

In a further preferred embodiment each oxygenation apparatus 40 further comprises at least one oxygen source 41, at least one oxygen diffusions tank 42, and at least one water source.

Typically, the oxygen diffusion tank 42 is substantially cylindrical and has a height between 15 and 150 feet. More preferably, the tank 42 has a height between 60 and 100 feet.

In at least one embodiment the oxygen source 41 is environmentally coupled to a dispersion member 43 positioned adjacent to a lower end of the oxygen diffusion tank 42 via an oxygen tube member 44. The oxygen tube member 44 is preferably at least partially routed along an interior of the oxygen diffusion tank 42. The water source 46 is preferably operationally coupled to a water-inlet 45 which is at least partially positioned within and near the top of the oxygen diffusion tank 42.

In at least one further embodiment, ozone may be added to the oxygen stream prior to routing into the oxygen diffusion tank 42.

In still a further embodiment, the dispersion member 43 is positioned slightly above the water outlet 45 such that oxygen released from the dispersion member 43 rises along an interior of the oxygen diffusion tank 42.

In a preferred embodiment a rate of flow of water from the water source through the water inlet 45 creates a downward water flow in the diffusion tank 42 that is slightly less than a rate of rise of oxygen bubbles through the water from the dispersion member 43.

In an embodiment oxygenated water collected from adjacent to a bottom end of the oxygen diffusion tank 42 has a dissolved oxygen content of approximately 1 mg of oxygen per 1 liter of water per foot of height of the oxygen diffusion tank 42.

In still a further embodiment oxygenated water is routed from adjacent to a top end of the at least one oxygenation apparatus 40 into the at least one aquaculture holding tank 20.

In an additional embodiment water flow from the source at the inlet 45 is gravity flow to the aquaculture holding tank 20.

The system 10 may also include a source of liquid oxygen generally stored in a tank. The liquid oxygen may be used as a backup source of oxygen in the event that one or more of the oxygenation apparatuses fails. Thus, the oxygen level of the water in the aquaculture holding tanks may be maintained until the failure of the oxygenation apparatus is corrected.

Further oxygen from any of the sources may be routed through an ozone generation system prior to distribution to at least one oxygenation apparatus 40.

Most typically, the filter apparatus 60 further comprises a distribution channel 61, a settling filter 66, and a biological filter 73. The distribution channel 61 may be environmentally coupled to a first drain member 23 of each one of the aquaculture holding tanks 20. The distribution channel 61 is primarily for receiving waste water from the aquaculture holding tanks 20. The settling filter 66 may be environmentally coupled to the distribution channel 61 for allowing at least a portion of particulate matter present in the waste water to settle out of the waste water. Similarly, the biological filter 73 may be environmentally coupled to the settling filter 66, for removing at least a portion of ammonia, biological oxygen demand (BOD), and carbon dioxide from the waste water.

In an embodiment the distribution channel 61 substantially extends along a length of the filter apparatus 60 and is subdivided into distribution channel segments 62. An interior of each one of the distribution channel segments 62 may be selectively separable from an adjacent distribution channel segment 62.

In yet a further embodiment each distribution channel segment 62 also includes a plurality of pipe members 63. Each one of the pipe members 63 may be used for selectively directing waste water from the distribution channel segment 62 into the settling filter 66. Preferably, the flow rate of each one of the plurality of pipe members 63 is adjustable.

While the channel form factor is preferred for the distribution function within the filter apparatus 60, a pipe may be used for this functional.

Similar to the distribution channel 61, in still a further preferred embodiment, the settling filter 66 extends along a length of the filter apparatus 60, is positioned adjacent to the distribution channel 61, and is subdivided into settling filter segments 67. An interior of each one of the settling filter segments 67 may be separated from an adjacent settling filter segment 67.

Preferably, each settling filter segment 67 includes a plurality of pipe members 68 for selectively directing waste water from the settling filter segment 67 into the biological filter 73. The flow rate of each one of the plurality of pipe members 68 is adjustable.

Further, in at least one embodiment the settling filter 66 further comprises at least one weir gate 69 for directing waste water from the settling filter 66 into the biological filter 73.

In a preferred embodiment the settling filter 66 has a sloped base 70 for directing settled particulate matter towards a drain 71.

Preferably, and similar to the settling filter 66 and the distribution channel 61, the biological filter 73 substantially extends along a length of the filter apparatus 60. The biological filter 73 is generally positioned adjacent to the settling filter 66.

In an embodiment the biological filter 73 further comprises a plurality of spray nozzles 74, a plurality of biomedia assemblies 75, an air space 77, and a water collection area 78. Each one of the spray nozzles 74 may be environmentally coupled to an associated pipe member 68 of the settling filter 66. Each biomedia assembly 75 is at least partially positioned below at least one of the spray nozzles 74 such that waste water directed out of the spray nozzle 74 is applied to at least a portion of the biomedia assembly 75. The air space 77 is positioned substantially below the plurality of biomedia assemblies 75. The water collection 78 area positioned below the air space 77.

In an embodiment at least one of the biomedia assemblies 75 is positioned at an oblique angle to a plane defined by the plurality of spray nozzles 74.

In still a further embodiment, each one of said plurality of biomedia assemblies 75 are positioned at an oblique angle relative to a plane defined by said plurality of spray nozzles 74, with every other biomedia assembly 75 being positioned substantially at a right angle to the biomedia assembly 75 immediately proceeding and immediately following the biomedia assembly 75.

In an embodiment each one of the biomedia assemblies 75 further comprises a porous frame assembly 79 and a quantity of biomedia 80 applied to a surface of the frame assembly 79. The porous nature of the frame assembly 79 allows waste water to flow through the biomedia 80 to the next biomedia assembly 75. It is understood that a wire frame or similar structure for the frame assembly 79 may be used for media that does not have the frame structure as an integral part of the media construction.

The biomedia assemblies 75 maybe constructed in relatively compact blocks, which may be stacked or otherwise arrayed for a variety of physical configurations.

Preferrably, the biomedia 75 includes culture of at least one species of *nitrosomonas* and at least one species of *nitrobacter*. The *nitrosomonas* aids in the conversion of NH4 to NO, that is ammonia to nitrite. Similarly, the *nitrobacter* will aid in the conversion of NO2 to NO3, which is nitrite to nitrate. It is understood by those skilled in the art that other bacteria will also be present in the biomedia.

In still a further embodiment plurality of the biomedia assemblies 75 extend at the oblique angle over a vertical height of between 6 and 20 feet.

In a preferred embodiment the plurality of the biomedia assemblies 75 extends at the oblique angle over a vertical height of approximately 9 feet.

The waste water directed from the settling filter into the biological filter may be directed over a subset of the biological filter. The specific subset used maybe adjusted on an interval basis. An illustrative example of such an interval basis for water distribution may be a slow sweep of water across the entire length of the biological filter, or switching between segments of the biological filter over time. The interval used or the percentage of the total biological filter used at any given time may be determined at least in part on the biological health of the biomedia bacterial community, the amount of nitrogen removed, or the amount of carbon dioxide removed.

As those skilled in the art may readily appreciate when carbon dioxide is present in water an equilibrium is reached, based in part upon the pH of the solution in which:

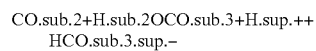

$$CO_2 + H_2O \rightleftharpoons CO_3 + H^{++} HCO_3^{-}$$

Additionally when Calcium is present Calcium Carbonate and Calcium Bicarbonate is formed and the following equilibrium is present (again dependent in part upon pH)

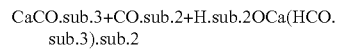

$$CaCO_3 + CO_2 + H_2O \rightleftharpoons Ca(HCO_3)_2$$

The biofilter facilitates the removal of carbon dioxide in not only the dissolved gas form (CO2), but also in the form of Ca(HCO$_3$)$_2$. This improved efficacy is one advantage of the present invention which allows for lower water flow throughout the system.

In at least one embodiment the airspace 77 has a vertical height of between 6 and 24 inches. More preferably, the airspace 77 has a vertical height of approximately 12 inches.

An air blower 82 is preferably environmentally coupleable to the air space 77 for directing a flow of air into the air space 77 and upwardly through the plurality of biomedia assemblies. This process helps to remove the Carbon Dioxide gas and Nitrogen gases from the biomedia and thus the waste water In an embodiment the biological filter 73 further comprises a sloped floor 84 for directing solid wastes toward a drain member 85 positioned substantially at abase of the sloped floor 84.

The system may also include a pump assembly 86 which may be environmentally coupled to the water collection area 78 of the biological filter 73 for directing filtered water collected in the water collection area 78 to the oxygenation apparatuses 40.

In a further embodiment, the system 10 may also include a second distribution channel 90 which may be environmentally coupled between the settling filter 66 and the biological filter 73 for facilitating direction of waste water from the settling filter 66 to various portions of the biological filter 73, even if a distribution channel segment 62 is closed or blocked off.

In still a further embodiment, the system 10 may include a waste treatment assembly 100 which may be environmentally coupled to waste outputs of the settling filter 66 and the biological filter 73. The waste treatment assembly 100 is particularly advantageous for zero discharge implementations of the system. Typically, the waste treatment assembly 100 includes a solids digestions system 110, a phosphate precipitation system 120, a water filtration system 140, and a processed water collection system 150.

In at least one embodiment the solids digestion system 110 includes a waste input 111, a solids digestion tank 112, an impeller 115, an anaerobic digestions culture 116, and a waste water output 117. The waste input is typically environmentally coupled to a drain of the settling filter and a drain of the biological filter and directs solid and liquid waste into the solids digestion system. The solids digestion tank 112 preferably has a sloped floor 113 with a waste drain 114 positioned at a base of the sloped floor 113. The impeller 115 is preferably positioned at least partially within the solids digestion tank 112 and at least intermittently stirs the solid and liquid waste positioned within the solids digestion tank 112. The anaerobic digestion culture 116 is preferably positioned within the solids digestion tank 112 for digesting at least a portion of the solid waste. The waste water output 117 is preferably environmentally coupled to the phosphate precipitation system 120. The waste drain 114 in the solids digestion tank 112 primarily collects minerals and salts after the anaerobic digestion process. The minerals may be washed to remove the salts. The salts may be returned to the system before the minerals are disposed.

In a further embodiment the phosphate precipitation system 120 further comprises a precipitation tank 122, an impeller 125, and a waste water output 126. Preferably, the precipitation tank 122 has a sloped floor 123 with a waste drain 124 positioned at a base of the sloped floor 123. The impeller 125 is preferably positioned at least partially within the precipitation tank 122 and at least intermittently stirs the solid and liquid waste positioned within the precipitation tank 122. The waste water output 126 may be environmentally coupled to the water filtration system 140. Typically, the phosphate precipitation system 120 also includes the use of a precipitation agent added at least intermittently to the precipitation tank 122. The precipitation agent may be processed fish scales, alum, other metal salt coagulants or polymers. Alternately, the precipitation agent may be a bacterial composition.

In an embodiment the waste drain 124 in the phosphate precipitation tank 122 primarily collects phosphates after the precipitation process In an embodiment the water filtration system 140 further comprises a sand filter 141 environmentally coupled to a waste water output 124 of the phosphate precipitation system 120. The sand filter 141 generally has a processed water output 142 for directing processed water out of the solids digestion system 110.

In even still a further embodiment the water filtration system 140 may also incorporate an ozone treatment system 150 for applying ozone to waste water being conducted through the sand filter 141.

In yet still a further embodiment, a protein skimmer 160 may environmentally coupled to the processed water output of the water filtration system 140. The protein skimmer 160 aids in the removal of single cell organisms, bacteria, and nitrates, and may be particularly useful in saltwater implementations of the system.

Still additionally, a screen filter 170 may be incorporated into the system and positioned after the biological filter 73. The screen filter may be implemented on a selective basis for aquaculture species preferring very clean water, such as salmon.

In yet a further possible water treatment step, UV light may be within the system 10 for further conditioning the water. Preferably, the UV light is incorporated into the system after the biological filter 73.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method of producing aquaculture comprising: providing a plurality of aquaculture holding tanks; providing a quantity of water positioned at least partially in said plurality of aquaculture holding tanks; providing a plurality of oxygenation apparatuses, at least one of said oxygenation apparatuses being operationally coupled to an associated one of said plurality of aquaculture holding tanks; providing at least one filter apparatus operationally coupled to said plurality of aquaculture holding tanks; providing a aquaculture species moving means operationally coupled to said plurality of aquaculture holding tanks; providing a starting quantity of at least one aquaculture species; providing feed for said at least one aquaculture species; thermally conditioning at least a portion of said quantity of water to a temperature suitable for promoting growth of said at least one aquaculture species; allowing said at least one aquaculture species to grow for a period of time; circulating at least a portion of said quantity of water; removing solid wastes from said plurality of aquaculture holding tanks at least intermittently; directing at least a portion of said quantity of water from said plurality of aquaculture holding tanks into said at least one filter apparatus at least intermittently; harvesting at least a portion of said starting quantity of at least one aquaculture species; wherein said step of providing at least one filter apparatus further comprises: providing a distribution channel environmentally coupleable to a first drain member of said at least one aquaculture holding system, said distribution channel being for receiving waste water from said at least one aquaculture holding system; providing a settling filter environmentally coupleable to said distribution channel, said settling filter being for allowing at least a portion of particulate matter present in the waste water to settle out of said waste water; providing a biological filter environmentally coupleable to said settling filter, said biological filter being for removing at least a portion of ammonia from said waste water; wherein said distribution channel is subdivided into distribution channel segments, an interior of each one of said distribution channel segments being selectively separable from an adjacent distribution channel segment; wherein each distribution channel segment further comprises a plurality of pipe members, each one of said pipe members being for selectively directing waste water from said distribution channel segment into said settling filter; wherein said settling filter is subdivided into settling filter segments, an interior of each one of said settling filter segments being selectively separable from an adjacent settling filter segment; wherein each settling filter segment further comprises a plurality of pipe members, each one of said pipe members being for selectively directing waste water from said settling filter segment into said biological filter; wherein a flow rate of each one of said plurality of pipe members is adjustable; and wherein said settling filter further comprises a sloped base for directing settled particulate matter towards a drain.

2. The method of claim 1, wherein the step of providing a plurality of oxygenation apparatuses further comprises: providing at least one oxygen source; providing at least one oxygen diffusions tank for each one of said plurality of oxygenation apparatus; providing at least one water source; wherein said oxygen diffusion tank further comprises a tank having a height between 15 and 150 feet ; wherein said at least one oxygen source being environmentally coupled to a dispersion member positioned to a lower end of said oxygen diffusion tanks via an oxygen tube member, said oxygen tube member being at least partially routed along an interior of said oxygen diffusion tank; wherein said at least one water source being operationally coupled to a water inlet said water inlet being at least partially positioned within said oxygen diffusion tank; wherein said dispersion member being positioned in said oxygen diffusion tank such that oxygen released from said dispersion member rises along an interior of said oxygen diffusion tank; and wherein oxygenated water collected from adjacent to a top end of the oxygenation tank has a dissolved oxygen content of approximately 1 mg of oxygen per 1 liter of water per foot of height of the oxygenation tank below the water collection point.

3. The method of claim 2, wherein said step of providing at least one oxygen source further comprises providing at least one tank of liquid oxygen environmentally coupled to said at least one source of oxygen.

4. The method of claim 2, wherein said step of providing a plurality of oxygenation apparatuses further comprises providing two oxygenation apparatuses for each one of said plurality of aquaculture holding tanks.

5. The method of claim 2, wherein said step of circulating at least a portion of said quantity of water further comprises adjusting a circulation rate based at least in part on oxygen content in the water.

6. The method of claim 1, wherein said step of providing a plurality of aquaculture holding tanks further comprises providing a first drain member and a second drain member for each one of said plurality of aquaculture holding tanks, said first drain member being operationally coupled between an interior of said aquaculture holding tank and said at least one filter apparatus, said second drain member positioned adjacent and below said first drain member, said second drain member having a conical intake section.

7. The method of claim 6, wherein said second drain member is drained intermittently.

8. The method of claim 6, wherein said step of providing a plurality of aquaculture holding tanks further comprises providing a plurality of aquaculture holding tanks each comprising fiberglass.

9. The method of claim 6, wherein said step of providing a plurality of aquaculture holding tanks further comprises providing a plurality of aquaculture holding tanks each comprising concrete.

10. The method of claim 1, further comprising the step of managing said drain of said settling filter based at least in part on the amount of denitrification accomplished within said settling filter.

11. The method of claim 1, further comprising the step of managing said drain of said settling filter based at least in part on the amount of nitrogen gas produced within said settling filter.

12. The method of claim 1, wherein said step of providing a biological filter further comprises: providing a plurality of spray nozzles, each one of said spray nozzles being environmentally coupled to an associated pipe member of said settling filter; providing a plurality of biomedia assemblies, each biomedia assembly being at least partially positioned below at least one of said spray nozzles such that waste water directed out of said at least one spray nozzle is applied to at least a portion of said biomedia assembly; providing an air space positioned substantially below said plurality of biomedia assemblies; and providing a water collection area positioned below said air space.

13. The method of claim 12, wherein said step of providing a plurality of biomedia assemblies further comprises the step of positioning each one of said plurality of biomedia assemblies at an oblique angle to a plane defined by the plurality of spray nozzles.

14. The method of claim 13, wherein said step of providing a plurality of biomedia assemblies further comprises: providing a plurality of porous frame assemblies; providing a quantity of biomedia; applying a portion of said quantity of biomedia to an associated one of said frame assemblies.

15. The method of claim 14, wherein said quantity of biomedia comprises a culture of species of *Nitrosomonas*.

16. The method of claim 15, wherein said quantity of biomedia comprises a culture of species of *Nitrobacter*.

17. The method of claim 16, wherein said step of directing at least a portion of said quantity of water from said plurality of aquaculture holding tanks into said at least one filter apparatus at least intermittently further comprises adjusting a quantity of water directed into at least one filter apparatus based at least in part on the biological health of said biomedia.

18. The method of claim 17, further comprising the steps of: providing an air blower environmentally coupleable to said air space; directing a flow of air from said air blower into said air space and upwardly through said plurality of biomedia assemblies.

* * * * *